United States Statutory Invention Registration [19]

[11] Reg. Number: H82

Dittrich et al. [45] Published: Jul. 1, 1986

[54] COMPOSITE GUN BARRELS

[75] Inventors: William A. Dittrich, Denville, N.J.; Roger Stanton, Stroudsburg, Pa.

[73] Assignee: The United States of America as represented by the Secretary of the Army, Washington, D.C.

[21] Appl. No.: 654,425

[22] Filed: Sep. 26, 1984

[51] Int. Cl.[4] ..... F41C 21/02; F41F 17/08; F16L 9/22

[52] U.S. Cl. ..... 42/76 A; 89/16; 138/155

[58] Field of Search ..... 42/76 A; 89/16; 138/155, 177; 285/173, 422; 228/2, 112, 113

[56] References Cited

U.S. PATENT DOCUMENTS

| | | | |
|---|---|---|---|
| 2,395,044 | 2/1946 | Gorton | 42/76 A |
| 2,775,164 | 12/1956 | Tillander et al. | 89/16 |
| 4,333,670 | 6/1982 | Holko | 228/112 |
| 4,387,844 | 6/1983 | Frank | 228/2 |

*Primary Examiner*—Deborah L. Kyle
*Assistant Examiner*—Ted L. Parr
*Attorney, Agent, or Firm*—Anthony T. Lane; Harold H. Card, Jr.; Michael C. Sachs

[57] ABSTRACT

This invention relates to composite gun barrels along the lines that a barrel be made of two or more different materials and of different outer diameters for optimum life and performance at different points along the length of the barrel. A composite gun barrel according to this invention includes a breech joined to a muzzle through a mid-section of the barrel by inertia or friction welding. Such a breech, muzzle and mid-section or mid-sections are made of different external diameters and wall thicknesses and of varying materials. A material more resistant to high temperature erosion and of larger outside diameter for high gas pressure is utilized at the chamber, while the material and wall thickness selected for use near the muzzle is optimum for frictional wear and lower pressure. A hot work tool steel such as H11 containing 1.5% Mn, 5% Cr, 0.4 V and 0.35 C is employed at the origin of rifling. Similarly, other remaining parts of the barrel may be made from a lower cost material such as SAE 4140, thus matching material properties to physical requirements as those requirements change throughout the barrel's length. A process for manufacturing said improved composite barrels is described to include inertia or friction welding of bars of dissimilar materials and of different diameters. It may also include rotary forging and/or machining of exterior surfaces to final dimensions, drilling of interior bore, heat treating and coating or plating.

4 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITE GUN BARRELS

GOVERNMENTAL INTEREST

The invention described herein may be manufactured, used and licensed by or for the Government for Governmental purposes without the payment to us of any royalties thereon.

BACKGROUND OF THE INVENTION

Gun barrels are required to withstand high internal pressures. In addition, military application requires severe (e.g. rapid sequential burst) firing schedules which subject them to high temperatures which cause wear and erosion, substantially shortening their useful life. While wear will occur throughout the length of the barrel, the most severe problem occurs at the origin of rifling, i.e., at the chamber end where the highest temperatures and pressures exist. As the projectile moves toward the muzzle, the increased volume within the gun barrel results in lowering of propellant gas pressure so that barrel strength need not be as great at the muzzle as at the breech. Previous attempts to improve barrel life have included use of high cost specialized materials such as CG27 for the entire barrel. Liners or inserts are also used at the chamber end to increase barrel life. Such inserts are normally made of stellite, an alloy containing a large percentage of cobalt which is both an expensive and scarce critical material available only from foreign sources. While such inserts minimize the requirements for costly material, a small insert of such material may typically cost as much or more than the remaining material in the barrel mass. While they do substantially improve life, the selection of the barrel and insert materials always results in a compromise, since the requirements for material properties vary along the length of the bore, as well as being dependent on other factors such as caliber, propellant type, and firing rates encountered. As a practical matter, the mentioned factors cannot be varied to improve barrel service life, because the existing U.S. combat weapon inventory represents a massive and irreversible commitment of resources. To change caliber, propellant type or firing rate would alter those operational design limits upon which the entire weapon is based, which would require replacement of entire stockpiles instead of one single weapon component. Accordingly, the present invention is intended as a solution to problems in presently available gun barrels and their composition as described hereinbefore, by avoiding any change in gun functions or operational limits such as would require design changes in the basic weapon and massive replacement of existing U.S. weapon inventories.

SUMMARY OF THE INVENTION

It is the object of the present invention to provide a gun barrel made of two or more materials of different properties and of different dimensions.

It is the further object of the present invention to provide an improved gun barrel of different properties for optimum life and performance at different points along the length of the barrel.

The present invention relates to composite gun barrels. The basic concept is that a barrel is made of two or more different materials and of different outer diameters for optimum life and performance at different points along the length of the barrel. The composite gun barrel includes a breech joined to a muzzle through a mid-section of the barrel by inertia or friction welding. Said breech, muzzle and mid-section or mid-sections are made of different external diameters and wall thicknesses and of varying materials. A material more resistant to high temperature erosion and of larger outside diameter for high gas pressure is utilized at the chamber, while the material and wall thickness selected for use near the muzzle is optimum for frictional wear and lower pressure. A hot work tool steel such as H11 containing 1.5% Mn, 5% Cr, 0.4 V and 0.35 C is employed at the origin of rifling. Similarly, other remaining parts of the barrel may be made from a lower cost material such as SAE 4140, thus matching material properties to physical requirements as those requirements change throughout the barrel's length. A process for manufacturing said improved composite barrels will include inertia or friction welding of bars of dissimilar materials and of different diameters. It may also include rotary forging and/or machining of exterior surfaces to final dimensions, drilling of interior bore, heat treating and coating or plating.

DESCRIPTION OF THE PREFERRED EMBODIMENTS

Figure 1:
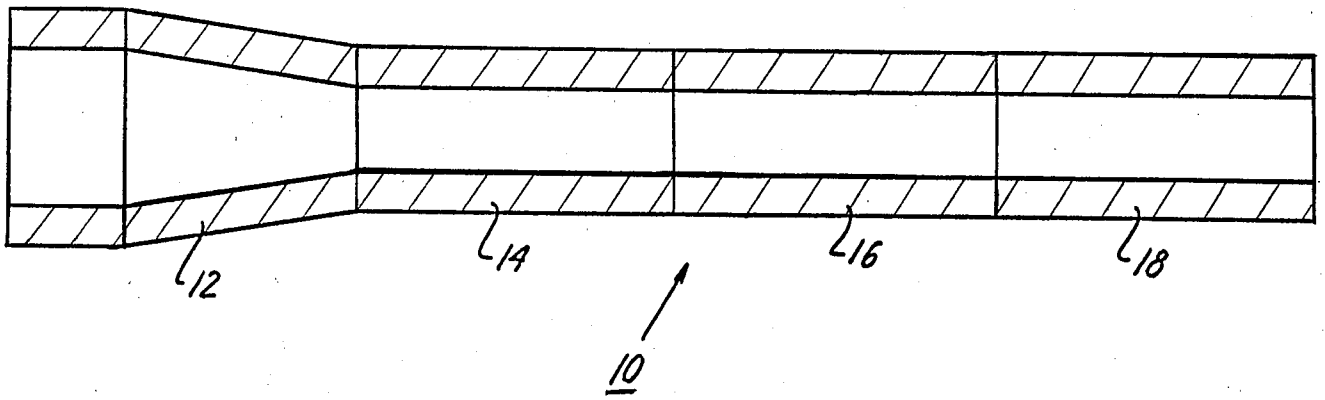
FIG. 1 represents a simplified cross-sectional of the improved gun barrel of the present invention.

FIG. 1 shows a gun barrel 10 comprising breech 12, a first elongate mid-section 14, a second elongate mid-section 16 and muzzle 18. The breech 12, mid-sections 14 and 16, and muzzle are made of dissimilar metals and joined or welded axially together by friction welding or inertia welding. The outer diameters and dimensions of the components also vary depending upon the design criteria and performance requirements. Arc welding is avoided in the inventive method disclosed herein because it results in puddling and other adverse effects which weaken the final product after the barrel is fully formed.

A hot work tool steel such as H11 containing 1.5% Mn, 5% Cr, 0.4 V and 0.35 C is employed at the origin of rifling, thus eliminating the need for an insert or chamber liner. The remaining parts of the barrel 10 could be produced from SAE 4140 or SAE 1040 steel alloys. How much of each type material to be used will depend on the operational environment of each caliber weapon. For example, the firing rate of a 0.5 inch machine gun is quite different from a 30 mm automatic cannon or a 155 mm howitzer. Chamber pressures differ and so it is necessary to define for each case how much of a given material is needed to satisfy the operational parameters encountered by each weapon system.

Steel billets of different physical properties and cost or availability for gun barrel use are preferably joined by means of friction or inertia welding to achieve a stronger joint by avoiding puddling. Shown in FIG. 1 is a breech 12 which may be of a relatively common alloy steel grade welded to a first mid-section 14 where the origin of rifling can be found and thus H11 tool steel would be specified. A second mid-section 16 is made of a plain carbon steel with strength and wear properties sufficient for the demands made for that region, while at the muzzle 18, another section of H11 might be located depending on the unique operational characteristics of that particular gun system.

A process for manufacturing the barrel 10 consists of inertia or friction welding of bars of two or more dissimilar materials as utilized above.

After welding of solid or tubular stock to form a composite elongate workpiece (not shown), the next step in forming barrel 10 is a stress relief and/or heat treatment in order to facilitate removal of flash and allow subsequent fabrication steps. Rotary forging may then be used to hammer swage a blank to a final size. For tubular or drilled blanks, by use of an appropriate mandrel, the barrel rifling can be engraved into the interior surface of the composite blank. Broaching of the rifle grooves may also be employed. Once the final dimensions required for a particular barrel are achieved, additional heat treatment or stress relief of the composite barrel may be performed.

A compromise must be made since the response to conventional heat treating practices will vary depending on alloy content of the steels employed. This would, of course, not be a problem in a monolithic barrel; but for a composite barrel, the high tempering temperature for a hot work steel (such as AISI H11) may result in the remaining barrel segments being softer than normally specified.

The process of making a gun barrel from a monolithic blank is well established. The present invention reveals that by means of friction welding, a bar can be produced whose chemistry varies as discrete segments are welded axially together. Furthermore, these segments are arranged in a sequence where the unique properties of each segment best suit the physical demands found at each portion of a functioning gun tube.

Accordingly, while there have been shown and described the preferred embodiments of the present invention, it will be understood that the invention may be practiced otherwise than as herein specifically illustrated or described and that within said embodiments, certain changes in detail and construction, or the form of arrangement of parts may be made without departing from the principles of this invention within the scope of the appended claims.

What is claimed is:

1. A generally cylindrical gun barrel comprising at least two elongate sections of differing physical properties joined together by friction welding.

2. A composite gun barrel as recited in claim 1 in which said elongate sections are welded axially together.

3. A composite gun barrel as recited in claim 1 in which said sections are of different external diameters and wall thicknesses.

4. A method of manufacturing a composite gun barrel which comprises:

(a) Welding together a plurality of elongate bars of dissimilar material in axial alignment with each other; and (b) Heat treating said welded bars;

(c) Machining said welded bars to form a single unitary gun barrel having a chamber at one end and a muzzle at the other, said chamber end being of material different from the material in said muzzle end.

* * * * *